Oct. 1, 1968  E. B. MYERS  3,403,887

BALL VALVE

Filed Nov. 28, 1966  2 Sheets-Sheet 1

INVENTOR.
EDWARD B. MYERS
BY
John Shaw Stevenson
AGENT.

Oct. 1, 1968   E. B. MYERS   3,403,887
BALL VALVE

Filed Nov. 28, 1966   2 Sheets-Sheet 2

INVENTOR.
EDWARD B. MYERS
BY
John Shan Stevenson
AGENT.

United States Patent Office 3,403,887
Patented Oct. 1, 1968

3,403,887
BALL VALVE
Edward B. Myers, Oreland, Pa., assignor to Honeywell Inc., Minneapolis, Minn., a corporation of Delaware
Filed Nov. 28, 1966, Ser. No. 597,379
9 Claims. (Cl. 251—209)

ABSTRACT OF THE DISCLOSURE

An improved fully rotatable ball valve provided with a spherical shaped plug having a flow passageway passing therethrough that has a V-shaped end portion to improve the sensitivity of conventional valves particularly in the initial stages of the opening of the valve and thereby provide a better streamline control of the fluid passing in either direction in a flow line without any of the parts of the valve being required to be disconnected and reassembled in the flow line.

---

It is one of the objects of the invention to disclose an improvement in ball valves that will provide better control of a fluid passing therethrough.

It is one of the more specific objects of the invention to disclose a characterized V-shaped passageway that extends part way through a ball of a ball valve in order to provide a way of improving the control of a fluid that is passed therethrough.

It is another object of the invention to provide a ball valve of the aforementioned type with the V-shaped passageway portion, e.g. facing the upstream side of a fluid in a flow line so that a streamline flow of fluid will be passed from the valve to a downstream portion of the flow line connected thereto without creating a flow disturbing turbulance that has heretofore had the tendency to reduce the efficient control operation of valves.

Another object of the invention is to disclose a valve of the aforementioned type that may be moved between a varying number of closed to open positions with a finer control of the amount of fluid flowing therethrough than is presently available with other commercially available ball valves.

It is another object of the present invention to provide a valve of the aforementioned type that is useful in more efficiently controlling the flow of slurries such as paper pulp as well as viscious fluids such as molasses and oils than has heretofore been possible with other commercially available valves.

It is another specific object of the present invention to disclose a V-shaped portion for a ball valve that can be rapidly rotatably reversed from a position facing an upstream flow of fluid to a position facing a downstream flow of fluid and vice versa to provide a fine streamline flow control in either direction when a reversal of flow of fluid in an upstream or downstream direction takes place.

It is still another object of the present invention to provide a seal for a ball valve which has an annular flexible ball contacting portion which protrudes from a stationary ring portion of the seal so that the stationary ring portion of the seal will have very little if any frictional force acting thereon to harm the stationary sealing portion when the ball is rotated.

A better understanding of the present invention may be had from the following detailed description when read in connection with the accompanying drawings in which.

Figure 6:
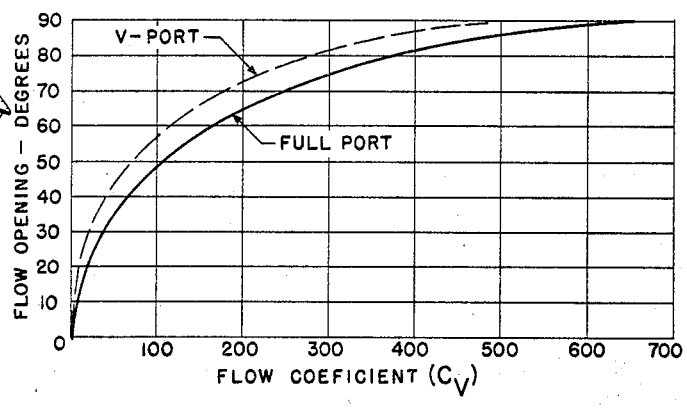
Figure 5:
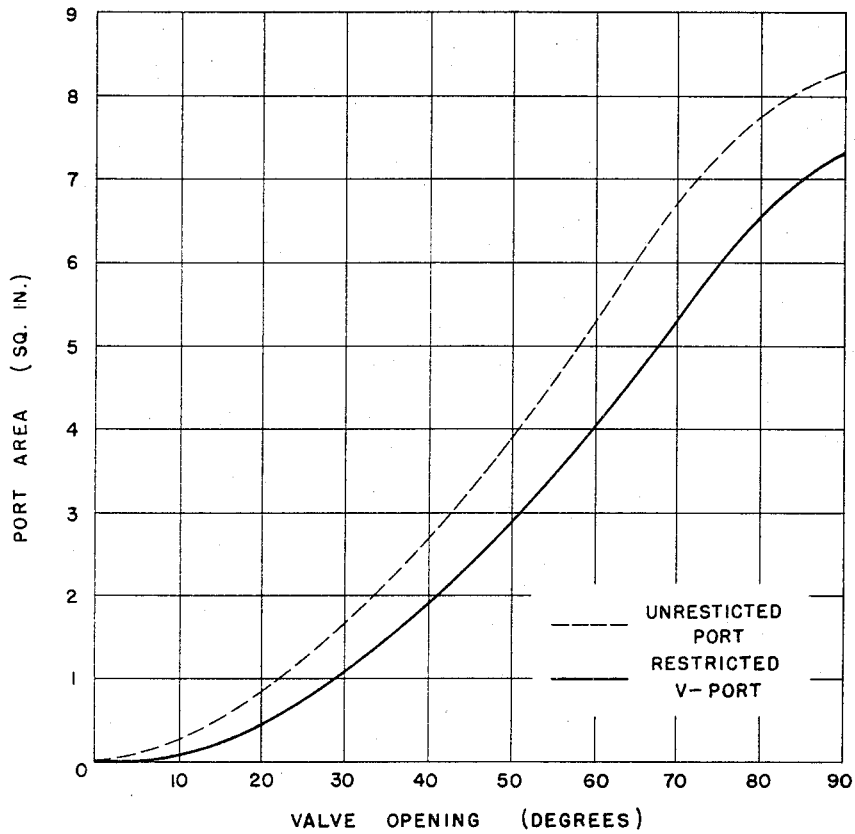

FIGURE 5 shows the comparison of the relationship of port areas that will be open for different degrees of opening of a conventional ball valve as contrasted against the relation of the port area that will be open for different degrees of opening of the valve disclosed herein having a V-shaped passageway portion therein and, FIGURE 6 illustrates in graphical form how greater sensitivity can be obtained by providing a V-shaped slot in one end of the plug of a ball valve.

Specifically, the apparatus to be hereinafter described employes a valve having a V-shaped slot as a part of one of the open ends of a passageway in a spherical shaped rotatable plug of a ball valve which can advantageously be positioned between a fluid inlet and outlet passageway of e.g. a venturi, so that:

The velocity of the fluid that is passed through this passageway will be maintained at a substantially constant value for a given opening of the valve and, Improved sensitivity is acquired for low angular openings of the valve over the sensitivity which present day commercially available valves afford.

The apparatus hereinafter described also employs a uniquely constructed seal at the inlet and outlet sides of the valve that has a ring portion integrally mounted for:

Flexing on an associated stationary ring seal portion while an inner ring surface of this flexible ring remains in fluid sealed tight, slidable engagement with the plug and, For providing a wall against which the shearing edge of the wall forming the V-shaped slot can be slid across and thereby provide an improved cleaner cut-off of slurries such as paper pulp, etc. when it is desired to close the valve and prevent these slurries from passing therethrough.

Figure 2:
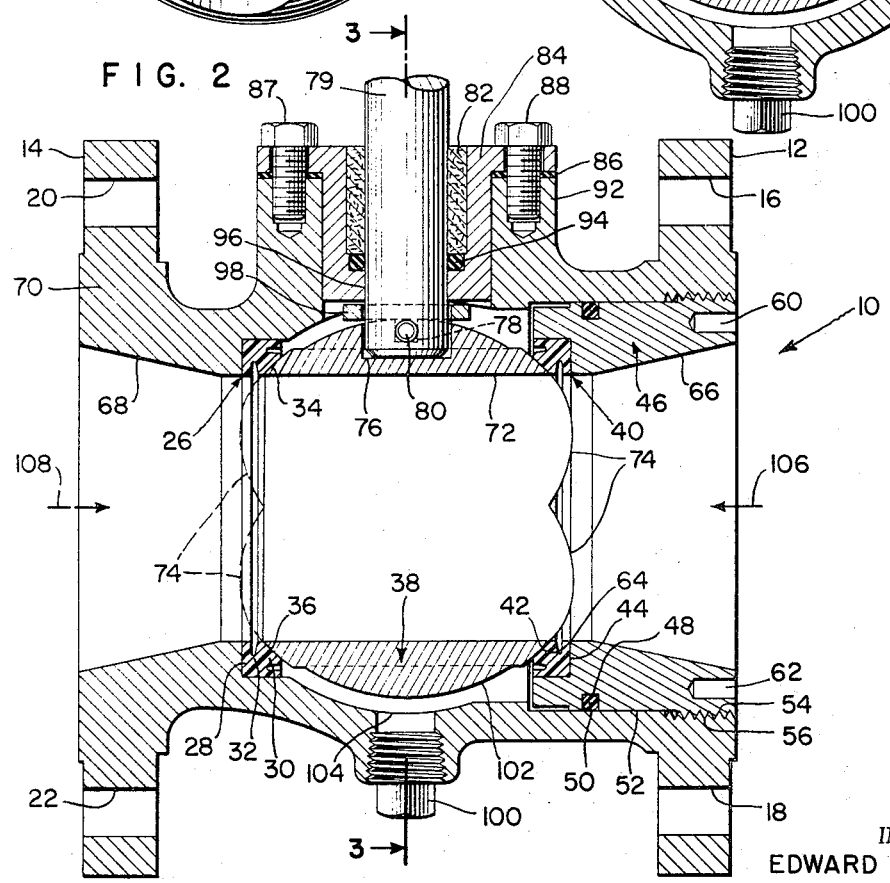
FIGURE 2 is a side elevation of the ball valve showing the valve mounted for movement in fluid tight engagement in a flow line between two ring seals.
Figure 4:
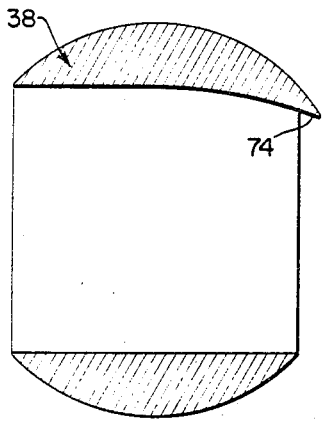
FIGURE 4 is a sectional view of the ball taken along the lines 4—4 of FIGURE 3.

FIGURE 2 shows a housing 10 having flanged end portions 12, 14 that contain a suitable number of apertures 16, 18, 20, 22 for bolting each one of the respective flange end portions 12, 14 to associated adjoining portions of a flanged pipe forming a flow line, not shown. The left end of the housing 10 has a cylindrical bored out portion 24 into which a ring shaped seal 26 is shown inserted. This seal 26 is unique in that it has an annular stationary portion 28 and an annular flexible portion 30. The latter portion 30 is connected to the stationary portion by a more narrow intermediate portion 32 so that the portion 30 can be flexed about this stationary portion 28.

An inner annular surface 34 of this seal 26, is shown in FIGURE 2, in contact with another annular surface 36 of a spherical shaped plug 38.

Another seal 40 is shown in sliding physical fluid tight surface-to-surface contact with another outer annular surface 42 of the spherical shaped plug 38 at its outer surface and retained in stationary force fit contact in a bored out surface 44 in a seal retainer 46. The seal retainer 46 is shown in FIGURE 2 containing an annular grooved out portion 48 with an O-ring seal 50 retained therein, that is in fluid tight engagement with the bored out surface 52.

Pipe threads 54 on the outer surface of the right end of the seal retainer 46 are shown engaged with the threads 56 on the right end of the bored out portion 52 of the housing 10. This threaded connection 54, 56 provides a means of applying a desired force to the right end of the seal 38 so that seals 26 and 40 will be retained in fluid tight engagement with the spherical shaped plug 38 when the retainer is rotated in a direction toward the plug 38 by inserting the prongs of a wrench, not shown, in the apertures 60, 62 and a suitable rotatable force is applied thereto.

The inner surface 64 of the seal 40 forms a right end support for the plug 38 and the seal 26 forms the only other remaining support for this plug 38.

The inner wall surface 66 of the seal retainer 46 and the inner wall surface 68 of the left end 70 of the housing 10 are of a frustro conical configuration and respectively form the right and left ends of a venturi, and the inner wall surface 72 of the spherical shaped plug 38 forms the throat portion of this venturi.

FIGURES 1–4 show various views of a part of this throat portion 72 converging into a V-shaped slotted wall portion 74.

Figure 1:
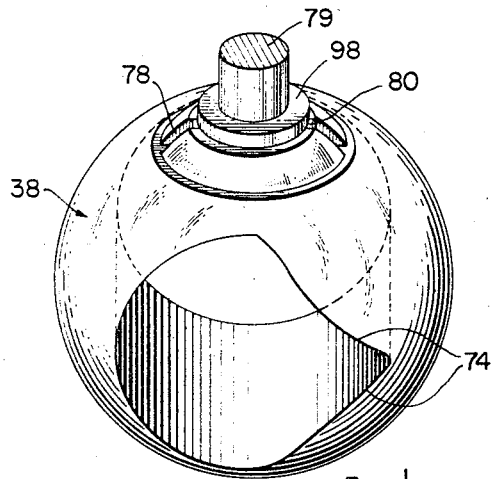
FIGURE 1 is a view of the spherical part of the ball valve showing the unique V-shaped passageway portion therein.
Figure 3:
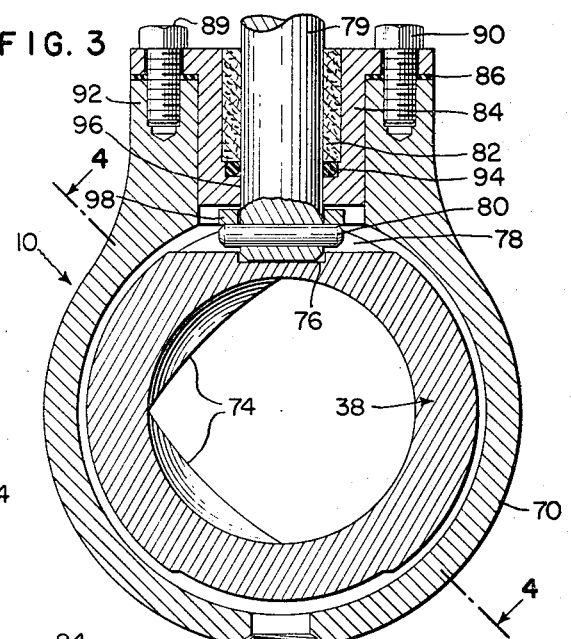
FIGURE 3 is a sectional view taken along the line 3—3 of FIGURE 2.

The top of the spherical shaped plug 38 has a surface 76 forming a slotted out wall portion into which one end of the stem 79 of the valve is shown inserted as is best shown in FIGURES 2 and 3. The top of the plug 38 also has another wall 78 forming a slotted out wall portion into which a pin 80 that is freely mounted in one end of the stem 79 is inserted in a snug manner and for driving engagement therewith when the stem is turned in either a clockwise or counterclockwise direction in the oil impregnated bearing 82. The outer cylindrical surface of the bearing 82 is retained in force fit engagement with the inner cylindrical surface of a bonnet 84 which in turn is mounted by means of a gasket 86 and cap screws 87, 88, 89, and 90 on an embossed portion 92 of housing 10.

An O-ring seal 94 is shown retained, by the lower end of the bearing 82 and a bored out wall surface 96, in fluid tight engagement with the stem 79. The stem 79 is free to rotate in bearing 82. O-shaped ring 94 and bored out surface of the wall portion 96 of the bonnet 84.

A washer 98 is shown loosely surrounding the lower end of the stem 79 to take up the wear that would otherwise take place between the top of the spherical shaped plug 38 and the lower end of the bonnet 84 when the stem and plug 38 are attached thereto by means of the pin and the slot connection 78, 80 are rotated as a unit.

A pipe plug 100 is employed to provide a means of cleaning out any sediment in the fluid that is passed through the valve which may settle in the space between the lower surface of the plug 102 and the lowermost inner surface 104 of the housing 10.

FIGURE 2 shows in solid line form the position of the V-shaped slotted wall portion 74 when a flowing stream of fluid such as a slurry being controlled by this valve is being directed from a flow line, not shown, in the right to left direction as indicated by the arrow 106.

FIGURE 2 also shows in dot-dash line form the position of the V-shaped slotted wall portion 74 when the flowing stream of fluid being controlled by this valve is being directed from a flow line, not shown, in a reverse or left to right direction as indicated by the arrow 108.

FIGURE 5 shows the amount a port of a ball valve and a port of a ball valve having the desired previously described unique V-shaped slot therein will be opened for different degrees of rotation of their respective stems.

FIGURE 6 shows the improved sensitivity acquired during low incremental angular openings of a ball valve that contains the previously described V-shaped slot 74 therein as contrasted with the sensitivity which a conventional ball valve affords. FIGURE 6, for example, requires a spherical shaped plug containing a V-shaped portion to be rotated through 40° before this valve will permit the same flow of fluid to be passed therethrough as a conventional valve that has been rotated through 33°. Improved sensitivity and control of a fluid flow can, therefore, be acquired particularly during the time in which the movement of the stem starts to initiate an opening of the valve containing a spherical plug 38 that has the unique V-shaped portion 74 therein.

The embodiments of the invention in which an exclusive property or privilege is claimed are defined as follows:

1. A ball valve, comprising a substantially spherical shaped plug, a wall forming a passageway that passes through the plug, and a V-shaped slot forming a part of one of the ends of the wall of said passageway, the wall forming the passageway being of a cylindrical shaped surface configuration and a part of the cylindrical wall surface converging into the wall surface of the passageway forming the V-shaped slot.

2. The rotary valve defined in claim 1 wherein a rolled edge surface is formed between the wall of the V-shaped slot and the outer peripheral surface of the spherical shaped plug.

3. The rotary valve defined in claim 1, comprising a body having walls forming inlet and outlet passageways, a stem mounted for rotation in the body, the substantially spherical shaped plug being positioned to separate the inlet passageway from the outlet passageway, said plug being positioned within the body and mounted for rotation with the stem, a first ring shaped seal extending between the wall forming a part of the inlet passageway in the body and an outer surface of the spherical shaped plug associated with the last mentioned wall, a second ring seal extending between a part of the wall forming the outlet passageway in the body and the outer surface of the spherical shaped plug associated with the last mentioned wall and the stem and plug member being operably connected for rotary movement in the body for moving the V-shaped slotted wall forming a passageway in the plug to and from different positions across the inlet passageway between a fully opened inlet passageway condition and a fully closed inlet passageway condition.

4. The rotary valve defined in claim 1, comprising a body having walls forming inlet and outlet passageways, a stem mounted for rotation in the body, the substantially spherical shaped plug being positioned to separate the inlet passageway from the outlet pasageway, said plug being positioned within the body and mounted for rotation with the stem, a first ring shaped seal extending between the wall forming a part of the inlet passageway in the body and an outer surface of the spherical shaped plug associated with the last mentioned wall, a second ring seal extending between a part of the wall forming the outlet pasageway in the body and the outer surface of the spherical shaped plug associated with the last mentioned wall, the stem and plug member being operably connected for rotary movement in the body for moving the V-shaped slotted wall forming a part of the passageway in the plug to and from different positions across the inlet passageway between a fully opened inlet passageway condition and a fully closed inlet passageway condition and wherein the V-shaped slot is of a tapered construction to enhance the sensitivity of the valve during low angular openings of the spherical shaped plug.

5. The rotary valve defined in claim 1, comprising a body having walls forming inlet and outlet passageways, a stem mounted for rotation in the body, the substantially spherical shaped plug being positioned to separate the inlet pasasgeway from the outlet passageway, said plug being positioned within the body and mounted for rotation with the stem, a first ring shaped seal extending between the wall forming a part of the inlet passageway in the body and an outer surface of the spherical shaped plug associated with the last mentioned wall, a second ring seal extending between a part of the wall forming the outlet passageway in the body and the outer surface of the spherical shaped plug associated with the last mentioned wall, the stem and plug being operably connected for rotary movement in the body for moving the V-shaped slotted wall forming a part of the passageway in the plug to and from different positions across the inlet passageway between a fully opened inlet passageway condition and a fully closed inlet passageway condition, each of the seals being comprised of a stationary ring portion fixedly retained in fluid tight engagement with an associated portion of the wall forming a different one of the passageways in the body, and an associated flexible ring portion extending from each of the stationary ring portions into physical fluid tight contact with outer surfaces of the plug.

6. The rotary valve defined in claim 1, comprising a body having walls forming inlet and outlet passageways, a stem mounted for rotation in the body, the substantially spherical shaped plug being positioned to separate the inlet passageway from the outlet passageway, said valve member being positioned within the body and mounted for rotation with the stem, a first ring shaped seal extending between the wall forming a part of the inlet passageway in the body and an outer surface of the spherical shaped plug associated with the last mentioned wall, a second ring seal extending between a part of the wall forming the outlet passageway in the body and the outer surface of the spherical shaped plug associated with the last mentioned wall, the stem and plug being operably connected for rotary movement in the body for moving the V-shaped slotted wall forming a part of the passageway in the plug to and from different positions across the inlet passageway between a fully opened inlet passageway condition and a fully closed inlet passageway condition, each of the seals being comprised of a stationary ring portion fixedly retained in fluid tight engagement with an associated portion of the wall forming a different one of the passageways in the body, an associated flexible ring portion extending from each of the stationary ring portions into physical fluid tight contact with the outer surfaces of the plug and wherein each seal contains an intermediate ring positioned between and integral with the stationary ring portion and the flexible ring portion which is of a narrower dimension than their stationary and flexible ring portions.

7. The rotary valve defined in claim 1, comprising a body having walls forming inlet and outlet passageways, a stem mounted for rotation in the body, the substantially spherical shaped plug being positioned to separate the inlet passageway from the outlet passageway, said plug being positioned within the body and mounted for rotation with the stem, a first ring shaped seal extending between the wall forming a part of the inlet pasageway in the body and an outer surface of the spherical shaped plug associated with the last mentioned wall, a second ring seal extending between a part of the wall forming the outlet passageway in the body and the outer surface of the spherical shaped 40 plug associated with the last mentioned wall, the stem and plug being operably connected for rotary movement in the body for moving the V-shaped slotted wall forming a part of the passageway in the plug to and from different positions across the inlet passageway between a fully opened inlet passageway condition and a fully closed inlet passageway condition, the stem and plug being further operably connected with the body for moving the V-shaped portion of the plug selectively into and out of alignment with the inlet and outlet passageways.

8. The rotary valve defined in claim 1, comprising a body having walls forming inlet and outlet passageways, a stem mounted for rotation in the body, the substantially spherical shaped plug being positioned to separate the inlet passageway from the outlet passageway, said plug being positioned within the body and mounted for rotation with the stem, a first ring shaped seal extending between the wall forming a part of the inlet passageway in the body and an outer surface of the spherical shaped plug associated with the last mentioned wall, a second ring seal extending between a part of the wall forming the outlet passageway in the body and the outer surface of the spherical shaped plug associated with the last mentioned wall, the stem and plug member being operably connected for rotary movement in the body for moving the V-shaped slotted wall forming a part of the passageway in the plug to and from different positions across the inlet passageway between a fully opened inlet passageway condition and a fully closed inlet passageway condition, and wherein means are provided in one of the parts of the wall forming one of the passageways in the body to adjustably compress the inner surface of the seal in that passageway into fluid tight engagement with the outer surface of the spherically shaped plug.

9. The rotary ball valve defined in claim 1, comprising a stem, a pin fixedly connected to one end of the stem, and a slotted out wall portion in the spherical shaped plug to accommodate the insertion of the pin in snug driving engagement therewith to rotate the plug when the stem is rotated in a clockwise and counterclockwise direction.

References Cited
UNITED STATES PATENTS

| | | | |
|---|---|---|---|
| 806,079 | 11/1905 | Gavelek | 251—209 |
| 1,534,866 | 4/1925 | Page | 251—209 X |
| 2,510,514 | 6/1950 | Mueller | 251—209 |

M. CARY NELSON, *Primary Examiner.*

M. O. STURM, *Assistant Examiner.*